United States Patent [19]

Dunlop et al.

[11] 4,148,776

[45] * Apr. 10, 1979

[54] SOLID PAINTS

[75] Inventors: Alfred N. Dunlop, Weston; Christopher G. Rickard, Mississauga, both of Canada

[73] Assignee: SCM (Canada) Limited, Don Mills, Canada

[ * ] Notice: The portion of the term of this patent subsequent to Nov. 30, 1993, has been disclaimed.

[21] Appl. No.: 725,633

[22] Filed: Sep. 22, 1976

Related U.S. Application Data

[63] Continuation-in-part of Ser. No. 534,826, Dec. 20, 1974, Pat. No. 3,994,848.

[30] Foreign Application Priority Data

Dec. 15, 1975 [GB] United Kingdom ............... 51311/75

[51] Int. Cl.$^2$ .............................................. C08K 5/05

[52] U.S. Cl. ............................ 260/33.4 R; 260/22 T; 260/23 P; 260/29.2 R; 260/29.2 UA; 260/29.2 E; 260/29.6 NR; 260/29.6 WB; 260/29.6 WA; 260/29.6 TA; 260/29.6 B; 260/29.6 BM; 260/29.6 BE; 260/29.6 SQ; 260/29.6 M; 260/29.6 N; 260/29.6 E; 260/29.6 MM; 260/29.6 CM; 260/29.6 AT; 260/29.6 PM; 260/33.4 PQ; 260/33.4 UR; 260/40 R; 260/42.29; 260/42.34; 260/32.6 R; 260/32.6 PQ; 260/32.6 NR; 428/522

[58] Field of Search ................ 260/29.2, 22, 23, 29.6, 260/32.4, 33.4, 33.6, 40, 42.29, 29.2 R, 29.2 U, 29.2 A, 29.2 E, 22 T, 23 P, 29.6 NR, 29.6 UA, 29.6 WB, 29.6 WA, 29.6 TA, 29.6 B, 29.6 BM, 29.6 BE, 29.6 SQ, 29.6 M; /29.6 E, 29.6 MM, 29.6 ME, 29.6 CM, 29.6 PS, 29.6 PM, 29.6 N, 29.6 MF, 29.6 AT, 32.6 R, 32.6 PQ, 32.6 NR, 33.4 R, 33.4 PQ, 33.4 UR, 33.6 R, 33.6 PQ, 33.6 UB, 33.6 UA, 40 R, 42.34; 428/522

[56] References Cited

U.S. PATENT DOCUMENTS 3,994,848  11/1976  Dunlop et al. ................. 260/29.2 E

OTHER PUBLICATIONS

"Ind. Eng. Chem. Prod. Res. Develop" vol. 12, No. 1, 1973, pp. 14–28, Dowbenko & Hart.

*Primary Examiner*—J. Ziegler
*Attorney, Agent, or Firm*—A. Joseph Gibbons

[57] ABSTRACT

Solid paint compositions having dimensional stability based on ion bonding of discrete particles are obtained by reacting stabilized non-aqueous dispersions of certain resins having acid group functionality with 100–500 mole percent of metallic hydroxide, based on acid, dissolved in a high dielectric polar solvent.

18 Claims, No Drawings

SOLID PAINTS

This application is a continuation-in-part of copending U.S. application Ser. No. 534,826 filed on Dec. 20, 1974 (now U.S. Pat. No. 3,994,848), priority to which is claimed as to all common subject matter. This application also corresponds to the United Kingdom Application No. 51311/75 filed on Dec. 15, 1975, the priority of which is hereby claimed under the provisions of 35 U.S.C. 119. The above applications together with copending application Ser. No. 534,827 filed Dec. 20, 1974, represents the closest prior art.

The present invention relates to a new type of paint product, namely, a solid paint having dimensional stability based on ion bonding.

Various resin compositions consisting of homopolymers and co-polymers having partially neutralized carboxylic acid groups are known. These contain between 3% and 20% of carboxylic acid residues of which less than 50 percent of the carboxylic acid groups are neutralized with mono-valent, di-valent or tri-valent cations. The prior art resins, known as Ionomers, are desirable in industry because they combine the utility of a thermoset polymer with the mobility and workability of the thermoplastic resin. Ionomers have lower densities than vinyl or cellulosic plastics and because of their similarity to polyethylenes find use as protective films in the food packaging industry. Ethylene-methacrylic acid co-polymers are discussed in U.S. Pat. Nos. 3,266,272, 3,338,739; and in Belgium Patents 674,595 and 600,397. Ethylene-sodium acrylate copolymers are described in Netherlands Pat. No. 6,511,920. Many of the desirable properties of these polymers such as stress-crack resistance, transparency, grease and abrasion resistance, low permeability, high elongation, high tensile strength, and low modulus are attributed in part to a type of ionic bonding.

It has now been discovered that solid paints having effective gel properties necessary to provide dimensional stability can be prepared by cross-linking certain reactive polymers with "ion clusters" having polar molecule components. This type of ion bonding differs substantially from the solvent-free ionic bonding of the prior art compounds.

One object of the present invention is to provide a solid paint composition having dimension stability based on ion bonding, i.e., ion cluster cross-linking of polymers, comprising the admixture of:

I. A. A solution of a curable polymer having a molecular weight ranging from 1,000 to 7,000 and sufficient reactive acid functional groups selected from the group consisting of carboxylic, sulfonic and phosphonic to provide an acid number from 20 to 80, said resin dissolved in a non-polar solvent to provide a 25 to 90 weight percent solution; or B. A stabilized dispersion of a polymer having a molecular weight ranging from 25,000 to 1,000,000 and sufficient reactive functional groups selected from the group consisting of carboxylic, sulfonic, and phosphonic to provide an acid number from 25 to 60, said resin suspended in a non-polar non-solvent as a 25 to 90 weight percent suspension; or C. A mixture of a non-bonding NAD resin comprising a stabilized dispersion of a polymer having a molecular weight ranging from 25,000 to 1,000,000 dispersed as a 25 to 90 weight percent suspension in a non-polar non-solvent, said resin having no reactive functional group sites, with an ion-bonding resin solution as defined in (IA), the proportion of non-bonding NAD resin to ion-bonding being from 2:1 to 8:1; and II. A solution of a metal hydroxide in a polar solvent of high dielectric strength to provide a 10–50 weight percent solution, said metal hydroxide selected from the group consisting of sodium, potassium, lithium, barium, calcium, manganese and magnesium; and III. Optionally a metallic drier in amounts from about 0.1 to 5 weight percent based on the total weight of polymer;

wherein said composition contains from about 100 to 500 mole percent of metal hydroxide per mole of acid functional group.

An additional object is to provide a process for preparing a solid paint having dimensional stability based on ion bonding and a gel strength from about 100 to 200 millimeter penetration which comprises:

(a) dissolving or suspending a curable polymer resin of the type shown in IA or IB or IC above to form the respective polymer composition or mixtures thereof in such proportion to provide sufficient reactive acid functional groups necessary for the indicated dimensional stability when cross-linked by ionic cross-linking agents;

(b) mixing pigments, fillers, colorants and 0 to 5 weight percent of an organic acid metal salt drier into the resin solution or dispersion;

(c) adding thereto under vigorous stirring a 20 to 30 weight percent solution of metal hydroxide in a $C_{1-8}$ aliphatic alcohol containing 100 to 600 mole percent of the amount of metal hydroxide required to neutralize said reactive acid groups of the resin;

(d) ageing the mixture for 3 to 25 hours at a temperature between 15 and 70 degrees Centigrade.

A further object is to provide paint sticks or bars based on the above compositions and processes.

Solid paint compositions having dimensional stability and desirable paint characteristics result from the interaction of certain polymers, having reactive functional groups, with certain cross-linking agents formed by dissolving a metal hydroxide in a high dielectric polar solvent. Cross-linking of the polymer chains takes place through "ion clusters" composed of multiple ions associated with polar solvent molecules. By the term solid paint is meant a paint which has sufficient dimensional stability under storage conditions, i.e., is self-supporting, yet could be utilized as a stick of paint (analogous to a segment of hard butter or cheese). Such solid paint can advantageously be applied by hand to the surfaces usually protected by paint and coating products without the use of a brush or roller. For practical and protective purposes, such stick of paint will generally be contained in a skin or covering suitable for storage. Advantageously such protective cover will have a closeable opening, said covering being distinct from the nature of an applicator in the usual sense. The solid paint can be used by placing the paint stick in contact with the surface to be painted followed by the usual vertical and lateral movements across the substrate whereby a non-sagging, air-curable paint film is deposited thereon. The shear provided by drawing the paint stick over the surface to be painted is sufficient to cause the solid paint to deform to a flowable coating at the point of contact. Such a solid paint coating is one that possesses the desirable properties of adhesion, flow and uniform coverage of the surface. It is assumed that the solid paint of the present invention will contain the usual pigments, fillers, driers, bonding agents, and other additives to provide films having desirable properties of gloss, color, and hiding power. It is anticipated that such a solid paint could be fabricated in blocks or sticks having widths ranging from ⅛" to about 8 feet or larger, thus, also allowing use in industrial applications such as, for example, coil coating of metal.

When the curable resin is a solution of a curable polymer in a non-polar solvent as shown in I.S. above, the resins useful in the present invention include homopolymers and copolymers and mixtures thereof having appropriate functional groups either built into the polymer chain or grafted thereto by the usual graft techniques. Useful resins include but are not limited to polyethers, polyesters, unsaturated polyesters, polyurethanes, polyolefins, polyacrylates, polyhydrocarbons derived from aliphatic and aromatic hydrocarbons having $\alpha,\beta$-unsaturation, vinyl resins and chlorine-substituted vinyls as well as other combinations known to the art. The particular reactants and quantities are chosen to produce resins having pendant and/or terminal functional substituents which are capable of further reaction with ionic reagents to form gels of proper dimensional stability and gel strength. Desirable application properties result when the gel strength is from about 100 to 190 and preferably from 135 to 180 when measured 25 hours after gelling. Gel strength is recorded in millimeter units using a Universal Penetrometer—the lower the penetrometer reading, the higher the gel strength.

Regardless of the type of resin used in the practice of this invention, it is essential that the particular resin be soluble in a non-polar solvent and that the resin have pendant and/or terminal functional reactive groups which are readily ionizable. Such ionizable groups include both cationic and anionic reactive functions. Preferably, anionic functional groups used to modify the resin are the sulfonic, phosphonic and carboxylic types. The carboxylic acid functionality is especially preferred since a variety of polymers having such reactive ionizable groups can be readily purchased or synthesized. Preferred reaction products are those obtained from the combination of carboxylic acid substituted polyesters and alkyd polyesters having molecular weights in the range of from about 1000 to 7000 which contain from about 1 to 4 reactive functional groups per each 2,000 unit of molecular weight. Polyesters and polyethers having molecular weights in the range of 400–2000 and which yield solid paints of desirable gel properties are especially preferred. Alkyd resins modified with fatty acid groups and having terminal carboxylic functionality are exemplified in the best mode Examples. In the case of polyolefins, polyacrylates and other systems where no air-curing will occur, a higher molecular weight of the order of 100,000 is usually necessary. However, 1 to 4 reactive functional groups are still required per 2,000 unit of molecular weight. The alkyd resins useful in the practice of this invention are prepared by polymerizing the polymer monomers and other intermediates in a fusion cook at a temperature of about 400°–600° F. to yield resins having an acid value (A.V.) ranging from 30 to 55 and preferably 41±2. Certain "longer" oil resins as exemplified hereafter in Examples 1 and 2 are polymerized at 450° F. to an A.V. of 43.0.

The above described polymers having ionizable reactive groups are dissolved in sufficient non-polar solvents to provide solutions having non-volatile (N.V.) contents of from about 10 to 90 and preferably from 35 to 60 weight percent. Especially preferred are solutions of 50% N.V. Suitable non-polar solvents for dissolving the polymer include both aromatic and aliphatic-type hydrocarbons and are selected based on the particular resin used, the functionality on said resin, and the nature of the ionic reactant. In general, suitable solvents are hydrocarbons having a boiling point of about 125° to 400° F. and which contain up to twelve carbon atoms. These include hexane, heptane, octane, nonane, decane and mixtures thereof. Preferred hydrocarbons are the various octanes because of their suitable evaporation rates. Mineral spirits is an especially preferred solvent because of its availability and the desirable properties of the resultant solid paint. In certain cases aromatic hydrocarbons such as toluene and xylene can advantageously be used and are especially valuable in dissolving the higher molecular polymers.

It is understood that the solvent, resin and proportions of each will vary and depend on the type of resins, the type of solvent, the fillers and other additives needed for a particular end-product solid paint. The additives, driers and other usual dispersant aids can be blended with the resin solution using a Cowles agitator. The order of addition is usually not critical. If desired, the pigments and other additives may be blended with the resin material prior to the solution of the resin in the non-polar solvent. After the additives are thoroughly mixed, the resulting composition is advantageously allowed to age for 12 to 20 hours before reacting with the ionic component.

When the curable resin is a stabilized dispersion of a polymer in a non-polar non-solvent medium as shown in I.B. above, the resins useful in the present invention include homopolymers and copolymers and mixtures thereof having appropriate functional groups either built into the polymer chain or grafted thereto by the usual graft techniques. Such resins include but are not limited to polyethers, unsaturated polyesters, polyurethanes, polyacrylates, vinyl resin and chlorine-substituted vinyls as well as other combinations known to the art. The particular reactants and quantities are chosen to produce a resin having pendant functional substituents which are capable of further reactions with ionic reagents to form gels of proper dimensional stability and gel strength. Desirable application properties result when the gel strength is from about 130 to 210 and preferably from 150 to 195 mm when measured 25 hours after gelling. Gel strength is recorded in millimeter units using a Universal penetrometer-the lower the penetrometer reading, the higher the gel strength.

For the I.B. type of resin formulation used in the practice of this invention, it is essential that the particular resin be insoluble or only lightly swelled by the non-solvent, as is necessary for any non-aqueous dispersion, and that the resin have pendant reactive groups which are readily ionizable. Such ionizable groups include both cationic and anionic reactive functions. Preferably, anionic functional groups used to modify the resin are the sulfonic, phosphonic, and carboxylic types. The carboxylic acid functionality is especially preferred since a variety of polymers having such reactive ionizable groups can be readily purchased or synthesized. Preferred resins are copolymers of unsaturated hydrocarbons and unsaturated acids having molecular weights in the range of 100,000 to 300,000. Especially useful resins for the practice of this invention are acrylic acid esters and vinyl polymers having a particle size range of from 0.01 to 30 microns. Acrylate and methacrylate copolymers having terminal carboxy functionality are especially preferred and are illustrated in the best mode examples. Non-aqueous dispersions (NADs) known to the art and particularly useful in the practice of this invention (if these are modified to have ionizable sites on the surface) include those described by Dowbenko and Hart, Ind. Eng. Chem. Prod. Res. Develop., Vol. 12, No. 1, 1973 at pages 14–28. The polymers and stabilizers described therein are hereby incorporated by reference. In the formation of such NADs the choice and level of stabilizer is eminently important to provide solid paints having desirable application flow and coalescence characteristics. Other useful NAD resin include those derived from poly (methyl methacrylate), polyacrylate and polymethacrylate resin and copolymers of these derived through addition polymerization with polyolefins, such as polyethylene, poly (vinyl ethyl ether), vinyl acetate, hydroxyethyl acrylate and 2 hydroxypropyl methacrylate.

The polymer resins useful in this aspect of the invention can be prepared by solution polymerization followed by dispersion in a non-solvent or by dispersion polymerization. The first method involves polymerizing the monomer or comonomers and other intermediates under free radical conditions at a temperature of about −50° to +250° F. to yield a resin having an acid value (AV) ranging from 20 to 80 and preferably from 25 to 60. The second and preferred method involves polymerizing the monomer or comonomers and other intermediates in a non-solvent under free radical conditions at a temperature of about 31 50° to +250° F. to yield a resin dispersion with the desirable acid value.

The above described polymers having ionizable reactive groups are dispersed in a non-polar non-solvent to provide a dispersion having non-volatile (N/V) content of from about 10 to 90 and preferably from 30 to 60 weight percent. Especially preferred are dispersions of 50% N/V. Suitable non-solvents include both aromatic and aliphatic type hydrocarbons which are selected based on the particular resin, the functionality on said resin and the nature of the ionic reactant. In general suitable non-solvents are hydrocarbons having a boiling point of about 100° to 400° F. and which contain up to twelve carbon atoms. These include hexane, heptane, octane, nonane, decane, dodecane and mixtures thereof. Preferred hydrocarbons are the various octanes because of their suitable evaporation rates. Mineral spirits is an especially preferred solvent because of its availability and the desirable properties of the resultant solid paint. For some resin systems aromatic hydrocarbons such as toluene or xylene may be used.

It is recognized that NAD resins can be suitably formulated with various stabilizers known to the art. The function of these stabilizers is primarily to prevent the resin particle from coalescing on storage and during formulation into solid paint products. Useful stabilizers include those described and referenced in the above noted article by Dowbenko and Hart. Polyene stabilizers which are useful for certain solid paint compositions include low molecular weight polybutadiene, grafted to a backbone of an acrylic copolymer. For the instant solid paints NAD resin stabilized by copolymers of methyl methacrylate and glycidyl methacrylate and further reacted with 12-hydroxy-stearic acid and/or poly (lauryl methacrylate) are especially preferred.

It is understood that the non-solvent, resin and proportions of each will vary and depend on the type of resins, stabilizers, non-solvent, fillers and other additives needed for a particular end-product solid paint. The additives, driers and other usual dispersant aids are preferably blended with the resin dispersion using a Cowles agitator. The order of addition is usually not critical. The typical solid paint formulations as described herein are of the latex type non-aqueous resin dispersion and do not usually require specific drier components to give suitable film properties; when driers are added they are used in quantities less than 2 percent and preferably less than 1 percent per weight of total composition. The driers are added for the small amount of oil or alkyd that is normally added to the formulation to aid dispersion of the pigment and to aid in the coalescence of the film. After application the resin particles coalesce and fuse to give a dry film in a matter of minutes.

The polymer formulations shown in I.A. (solution of polymer in a non-polar hydrocarbon) or the formulation of I.B. (stabilized dispersion in a non-polar non-solvent) are next combined with the ionic cross-linking agents dissolved in a high dielectric polar solvent.

Suitable ionic cross-linking reactants are usually of the inorganic salt variety which produce on solution specific cations or anions capable of combining with the terminal reactive groups of the resin to form ion clusters responsible for gel formation. Such clusters, which contain the high dielectric polar solvent molecules, act as reversible cross-links to join the reactive resin molecules in webs thus imparting gel strength and dimensional stability to the resultant solid paint. When the reactive terminal sites on the polymer are carboxylic acid groups (—COOH), the preferred cross-linking reactants are alcoholic solutions of mono, di and trivalent metal hydroxides. Such cross-linking reactants include the oxides and hydroxides of sodium, potassium, lithium, barium, calcium, manganese and magnesium. Equally effective cross-linking agents are the corresponding metal alkoxides, i.e., sodium methylate. In some cases ammonium hydroxide and organic cation formers such as tetramethyl-ammonium hydroxide can be used as cross-linking reactants. The cross-linking gelation derived by reacting sodium hydroxide with the above described resin molecules having terminal or pendant carboxyl groups is especially preferred. Suitable gels result when an effective amount of the cationic base combines with the free carboxylic acid functionality. In every case an amount of base substantially in excess of the amount required for neutralization is necessary to be effective. By substantial excess is meant from about 100–600 mole percent of ionic reactant dissolved in the polar solvent. Although the amount of excess varies with each particular resin system and depends upon the molecular weight of the resin, the number and type of the ionizable functional group and on the valence of the metal hydroxide, satisfactory gels result when the ionic reagent is used at 100–600 mole percent excess. When amounts less than 100 mole percent are used the resins do not exhibit the required dimensional stability. When amounts greater than 600 mole percent are used the resins do not exhibit the desired flow and surface characteristics. For gel formation the metal hydroxide or other ionic cross-linking reactant is added as a 10–50 weight percent solution in the high dielectric polar solvent to the polymer resin formulations. Preferred solid paints were obtained by using 100 to 250 mole percent sodium hydroxide based on the molar content of the reactive functional group, i.e., moles free COOH.

The polar solvents useful in dissolving the ionic cross-linking agents are generally those solvents having a dielectric constant greater than 10, include aliphatic alcohols containing one to ten carbon atoms and one to two hydroxy groups. Although $C_{1-8}$ aliphatic alcohols are usually preferred, glycols containing the similar carbon chains are sometimes useful in producing desirable gel properties in the resultant solid paint. Useful alcohols include methanol, ethanol, isopropanol, n-propanol, the normal and isomeric butanols, pentanols, hexanols, heptanols, octanols, as well as the corresponding glycols derived therefrom. Methanol is the preferred alcohol because of its costs, availability and the favorable solubility of the ionic reagents therein. In certain applications it is preferred to use glycols or mixtures of glycols and alcohols as the plasticizer carrier for the ionic reactant. Preferred glycols are ethylene glycol and propylene glycol although for certain resins the higher glycols such as pentanediol and hexanediol act in the nature of a plasticizer and provide desirable lubricity. Additional high dielectric polar solvents useful in the practice of this invention include, water, formamide, dimethylformamide, and dimethylsulfoxide.

The metal driers suitable for the instant solid paint compositions are those known to the art and include the metal salts and/or esters of various organic carboxylic acids containing up to 30 carbon atoms and mixtures thereof. The metal salts of cobalt, zinc, zirconium, magnesium, aluminum and manganese prepared from branched chain $C_{8-12}$ carboxylic acids are preferred driers. The typical paint formulations, as described herein, required unusually high amounts of metal drier of the order of about 0.5 to 5 percent based on the weight of the resin. The amount of drier needed depends to some extent on the oil or other source of double bonds used in the paint system, i.e. number and type of double bonds available.

A further aspect of this invention includes the use of resins having pendant and/or terminal functional reactive groups other than the acid or carboxylate groups. When the ionizable group on the polymer is a cationic group precursor instead of an acid or carboxylate group, the ionic cross-linking reactant will be an anion precursor. Examples of cation formers are (1) primary, secondary, tertiary and cyclic amines, which react with hydrogen halides and hydrocarbon halides to give quaternary halides to give quaternary salts; (2) substituted phosphines which combine with halides to give phosphonium salts; (3) sulfides which react with alkyl halides to give sulfonium salts; (4) cyclic ethers which react with acids to give oxonium salts. Examples of anion source cross-linking agents include acetic acid, nitric acid, hydrochloric acid, sulfuric acid, and relatively short chain organic multibasic acids such as oxalic, malic, succinic, maleic, adipic acids and corresponding anhydrides.

For industrial coating purposes, the block of solid paint is advantageously contained in conventional holding and applicator devices. Such devices, which will vary with the nature of the substrate to be coated and will be adaptable to continuous application, usually include a device for holding the solid paint and a mechanism for adjusting the pressure placed on the paint block to allow proper deformation to provide a fluid coating and film of required thickness. Increasing the pressure applied to the solid paint will result in the deposit of a heavier coating. Although the instant solid paints are capable of air drying, it is contemplated that for industrial coating applications curing of the film may be accelerated by the use of heat, and other energy techniques known to the art.

The following specific examples illustrate only a limited number of embodiments; accordingly, the invention is not limited thereto. All parts and percentages being by weight unless otherwise indicated. The driers used were commercially available conventional driers. The "mineral spirits" and the "odorless mineral spirits" had a boiling range of 300°–400° F. and 345°–410° F. respectively. Molecular weights reported are number average molecular weights unless otherwise specified. Examples 1 through 12 exemplify the I.A. type of polymer solution formulations whereas Examples 13 through 19 exemplify the I.B. type polymer dispersion formulations. Examples 20 through 23 exemplify mixtures of the I.A. type of polymer solution formulations used in conjunction with non-bonding (no reactive acid functionality) non-aqueous dispersions.

EXAMPLE 1

Resin A was prepared by polymerizing a mixture (in amounts shown below) of trimethylolethane (TME), dehydrated castor fatty acid (DCOFA), Azelaic dimer acid (AZELAIC 1110) and dimer acid (EMPOL 1014) at 460° F. as a fusion cook to an acid value of 41 (41±2 normal range).

Resin B, a "longer" oil resin, was prepared in a fashion similar to Resin A by polymerizing at 450° F. to an acid value of 42.0

Resin C, prepared using Pentaerythritol (PE) in place of trimethylolethane (TME), was polymerized at 460° F. to an acid value of 42.0

Resin D, prepared using a combination of DCOFA and Tung Oil instead of simply DCOFA, was polymerized at 460° F. to an acid value of 43.0.

TABLE I

|  | Material | Mols | Wt. | Acid Value |
| --- | --- | --- | --- | --- |
| Resin A | TME | 2.46 | 295 | 41 |
|  | DCOFA | 2.46 | 690 |  |
|  | AZELAIC 1110 | 1.78 | 340 |  |
|  | EMPOL 1014 | 0.74 | 423 |  |
| Resin B | TME | 2.0 | 240 | 43 |
|  | DCOFA | 2.4 | 672 |  |
|  | AZELAIC 1110 | 1.42 | 270 |  |
|  | EMPOL 1014 | 0.59 | 337 |  |
| Resin C | PE | 1.0 | 136 | 42 |
|  | DCOFA | 2.0 | 560 |  |
|  | AZELAIC 1110 | 0.72 | 135 |  |
|  | EMPOL 1014 | 0.29 | 168 |  |
| Resin D | TME | 1.0 | 120 | 43 |
|  | DCOFA | 0.6 | 168 |  |
|  | TUNG OIL | 0.19 | 168.5 |  |
|  | AZELAIC 1110 | 0.48 | 91.6 |  |
|  | EMPOL 1014 | 0.97 | 555 |  |

EXAMPLE 2

The polyester Resin A (25 parts) was formulated into a hydrocarbon solution by mixing with 12 parts tung oil, 13 parts mineral spirits, 2.0 parts of a cobalt drier (12.0 percent metal), 2.0 parts manganese drier (9.0 percent metal) and 3.5 parts zirconium drier (12.0 percent metal) and the resultant composition was allowed to mature at room temperature for 16 hours. Titanium dioxide (40 parts) and calcium carbonate (10 parts) were blended with the resin solution under Cowles agitation to yield a #6 Hegman grind. Various weights of sodium hydroxide were then added as a 25 weight percent solution in methyl alcohol to form the solid paints identified in Table II. Solid Paint 2A exhibited a streaky film appearance, the paint was slightly too hard requiring too much effort to apply, i.e. exhibited too much drag on application, and application characteristics which were too hard.

The solid paints 2B and 2C with gel strength of 147 and 161 respectively exhibited satisfactory application characteristics and film appearance, i.e. the paint didn't require too much force to apply and the resultant film was uniform. All three solid paints exhibited dimensional stability and gave a satisfactory dry coating on application to a test panel surface.

TABLE II

| Exp. No. | Resin | Parts NaOH Added | Percent Neutralization Calculated on Moles Carboxylic Acid | Gel Strength* (24 hours) |
|---|---|---|---|---|
| 2A | A | 6.65 | 225 | 119 |
| 2B | A | 6.35 | 215 | 147 |
| 2C | A | 6.05 | 205 | 161 |
| 3A | C | 7.2 | 240 | 160 |
| 3B | C | 7.2 | 240 | 155 |
| 3C | C | 6.0 | 200 | 178 |
| 4A | C | 4.75 | 160 | 176 |
| 4B | C | 5.0 | 170 | 138 |
| 8A | C | 6.1 | 200 | 165 |
| 8B | C | 6.5 | 220 | 155 |

*Average of three determinations.

EXAMPLE 3

Resin C was formulated into paints 3A and 3B using the procedure outlined in Example 2 and the same relative amounts of resin, tung oil, mineral spirits, cobalt drier, manganese drier, zirconium drier, titanium dioxide, and calcium carbonate. A third paint formulation 3C was similarly prepared from Resin C but contained 1.3 parts of cobalt drier (12% metal), 0.5 parts manganese drier (9.0% metal), 3.0 parts zirconium drier (12% metal) and 0.19 parts aluminum stearate. The solid paints formed on the addition of 25% methanolic sodium hydroxide identified as 3A, 3B and 3C each exhibited satisfactory gel strengths, application characteristics, film appearance and drying quality.

EXAMPLE 4

Polyester Resin C (25 parts) was formulated into a hydrocarbon solution by mixing with 12 parts tung oil, 13 parts mineral spirits, 0.95 parts cobalt drier and 2.1 parts zinc drier (16 percent metal). A second resin formulation for Resin C was identical to the above except it contained only 0.9 parts of cobalt drier and additionally contained 0.45 parts of manganese drier. These resins and paints made therefrom which contained 50 parts titanium dioxide and no calcium carbonate are identified respectively as 4A and 4B in Table II. It is seen that paints 4A and 4B with neutralization values of 160 and 170 exhibit gel strengths of 176 and 138 respectively. The application characteristics of 4A were slightly inferior, the solid paint tended to be too soft. The film appearance and drying quality of both paints were acceptable.

EXAMPLE 5

Repeating the experiments 2A, 2B, 3A, 3B and 3C but adding the driers subsequent to the addition of pigment to the resin will result in essentially similar acceptable gel strengths, applications characteristics and drying rates.

EXAMPLE 6

Paint blocks of approximate size 4" × 6" were stored using a thin SARAN (Trademark of the Dow Chemical Company) envelope for a period of six months. Application of these paints to a test panel after the storage period showed no detectable deterioration of the application and film characteristics. Additionally, solid paints prepared from the same resins but having acid values in the range of from 30 to 60 gave acceptable solid paint characteristics. Equally good results were obtained when oiticica fatty acid, safflower fatty acid, soya fatty acid, or linseed fatty acid was used instead of dehydrated castor oil fatty acid. The best application properties were obtained when the gel strength as measured by the Universal penetrometer was between 130 and 180 mm. Gel strengths of from 100 to 130 and 180-190 gave effective solid paints with somewhat less desirable characteristics.

EXAMPLE 7

Resin D was prepared by first esterifying the dehydrated castor fatty acid (168 parts) with trimethylolethane (120 parts) at a temperature ranging up to 480° F. to yield a product of acid value 4.0. Thereafter an ester exchange was effected by further reaction with tung oil (168.5) in the presence of 2.0 parts of litharge catalyst until the product was completely miscible in methanol. The resulting product was combined with Azelaic 1110 (91.6 parts) and Empol 1014 (555 parts) and cooked to an acid value of 43.0. The resulting resin had an approximate molecular weight of 1300.

A cationic Resin E was prepared by condensing Resin D (1040.4 parts) with N,N-diethylaminoethanol in the presence of litharge (2.0 parts) catalyst using reaction conditions such that the predominant reaction was esterification rather than amide formation. After removal of water and excess N,N-diethylaminoethanol, Resin E had a molecular weight of 1500.

Gelation of Resin E was effected by neutralizing (100 and 300%) an 50/50 weight percent solution of Resin E in mineral spirits with 37% hydrochloric acid. The resultant solid paints had properties inferior to those of a corresponding gel neutralized to 200 percent with 32 N-sulfuric acid and resulting in gel strengths of from 100-150.

EXAMPLE 8

Polyester resin C (25 parts) was formulated into a hydrocarbon solution by mixing with 12 parts tung oil, 13 parts mineral spirits, 0.6 parts cobalt drier (12.0 percent metal), 0.6 parts manganese drier (9.0 percent metal) and 6.0 parts zirconium drier (12.0 percent metal) and the resultant composition was allowed to mature at room temperature for 16 hours. Titanium dioxide (40 parts) and calcium carbonate (10 parts) were blended with the resin solution under Cowles agitation to yield a #6 Hegman grind. Various weights of sodium hydroxide were then added as a 25 weight percent solution in methanol under reduced pressure in a "vacuum Cowles" to form a solid paint (Table II). This manner of addition diminishes the chance of entrapping air into the "final" solid paint. Paints 8A and 8B (of Table II) exhibited superior film appearance and application properties. Both paints were dimensionally stable and exhibited good dry on application to a test panel surface.

EXAMPLE 9

Resin F was prepared under free radical conditions as follows: 10 parts methacrylic acid, 90 parts lauryl methacrylate, 1 part Bis (4-t-butyl-cyclohexyl) peroxycarbonate (initiator), and 300 parts mineral spirits were added to the kettle. Polymerization was accomplished by heating to 60° C. and holding at this temperature for 2 hours while the mass in the kettle was being agitated. Conversion of 99% was achieved; acid value of the polymer was 65.0. Approximately 100 parts of the mineral spirits were removed by vacuum distillation.

Various weights of sodium hydroxide were added as a 25 weight percent solution in methanol to 75 parts of the 33 percent N/V resin with agitation as shown:

| Exp. No. | Parts NaOH Added | Percent Neutralization Calculated on Carboxylic Acid |
|---|---|---|
| A | 6.9 | 150 |
| B | 9.2 | 200 |

The two "clear" paints can be described as follows: Experiment A resulted in a product that was just barely dimensionally stable and exhibited poor application characteristics, i.e. on applying the paint laid down too thick a film and too much force (relative to the previous examples) was required to draw the sample across the test panel.

Experiment B resulted in a stronger product that exhibited good dimensional stability (gel strength of approximately 160 mm penetration) and good application characteristics. Paint B exhibited very little drag on application. Both these products resulted in a "dry" film on the test panel.

EXAMPLE 10

Resin G, a 100 percent N/V dicarboxypolybutadiene having a molecular weight of 1410 and an acid value of 65.0, was formulated into the following solid paint systems:

| Exp. No. | A | B | C | D |
|---|---|---|---|---|
| Resin G (parts) | 50 | 50 | 50 | 17 |
| Resin A | — | — | — | 33 |
| Mineral spirits | 50 | 50 | 50 | 50 |
| Cobalt drier (12 percent metal) | .5 | .5 | .5 | .5 |
| Zirconium drier (12 percent metal) | 1.7 | 1.7 | 1.7 | 1.7 |
| Titanium dioxide | — | 130 | 110 | 90 |
| Calcium carbonate | — | 70 | 50 | 40 |
| NaOH (25 parts in metahanol) | 18.0 | 20.2 | 36 | 24 |
| Percent Neutralization | 200 | 300 | 400 | 350 |
| Gel Strength (mm.) | 250 | 180 | 110 | 160 |

Paint A having a gel strength of 250 did not exhibit dimensional stability. Paints B, C and D were dimensionally stable. Under application action Paint B tended to put down too thick a film and was a little too elastic, i.e. tended to be slightly taffy like. Paint C was too hard and for this reason it resulted in poor quality application. Paint D exhibited dimensional stability and acceptable application. All the paints resulted in a dry film on the test panel.

EXAMPLE 11

Alkyd Resin H was prepared by polymerizing a mixture of 146 parts trimethylolpropane, 146 parts pentaerythritol, 908 parts dehydrated castor oil fatty acid, and 413 parts Azelaic dimer acid (AZELAIC 1110) at 480° F., as a fusion cook to an acid value of 42. The resulting resin exhibited a viscosity of $Z_2$ as determined using the Gardner-Holt Bubble Tube Test method ASTM D1545.

Alkyd Resin I was prepared by polymerizing a mixture of 116.5 parts trimethylolpropane, 116.5 parts pentaerythritol, 296 parts dehydrated castor oil fatty acid, and 821 parts Azelaic dimer acid (AZELAIC 1110) at a temperature of 460° F. to an acid value of 30. The resulting resin exhibited a viscosity of $Z_2$+(Gardner-Holt).

EXAMPLE 12

Solid paints were prepared from Resins H and I according to the procedure of Example 2 with the exception that driers were allowed to mature at room temperature for ½ hour, the order of addition of ingredients being as given in the following table with blending to a #5½ Hegman grind.

| Material | Parts | | | |
|---|---|---|---|---|
| Experiment No. | 1 | 2 | 3 | 4 |
| Resin I | — | — | — | 50 |
| Resin H | 50 | 50 | 37 | — |
| AC 100[a] | 30 | 30 | 54 | 30 |
| Dramatone Blue tinting base[b] | 2.5 | — | — | — |
| Titanium Dioxide | 100 | 100 | 100 | 100 |
| Min-u-Sil 10[c] | 10 | 10 | 10 | 10 |
| Celite 499[d] | 10 | 10 | 10 | 10 |
| Rheox 1[e] | 1.0 | — | 1.0 | 1.0 |
| Odourless mineral spirits | 50 | 55 | 44 | 50 |
| Cobalt drier (12.0 percent metal) | 0.3 | 0.3 | 0.3 | 0.3 |
| Manganese drier (9.0 percent metal) | 0.15 | 0.15 | 0.15 | 0.15 |
| Zirconium drier (12.0 percent metal) | 3.0 | 3.0 | 3.0 | 3.0 |
| Methyl ethyl Ketoxime | 0.2 | — | 0.2 | — |
| sodium hydroxide - methanol (24 percent sodium hydroxide) | 8.0 | 8.0 | 8.0 | 8.0 |
| % neutralization | 130 | 130 | 180 | 160 |
| gel strength (mm) | 170 | 170 | 160 | 180 |

[a] a diluent alkyd resin not capable of direct participation in ionic bonding — Reichhold Chemicals Canada Ltd.
[b] DRAMATONE is trademarked product of GLIDDEN-DURKEE, Division of SCM Corporation.
[c] Crystalline silica product of Pennsylvania Glass Sand Corp.
[d] Diatomaceous silica product of Johns-Manville Co.
[e] Bodying agent product of N L Industries.

The solid paints 1, 2, and 3 exhibited dimensional stability and characteristics equivalent or superior to the solid paint products of the previous Examples. When applied to a substrate by contact and hand pressure desirable surface films were obtained which air cured overnight.

PREPARATION OF NAD RESINS

The NAD resins 1, 2, 2A, 3 and 4 were prepared by addition polymerization of various monomers in the presence of non-solvents, free radical initiators and various stabilizers in the relative proportions shown in Table III. A small portion of the monomers is charged to the polymerization kettle with the non-solvent and about 50 percent of the desired stabilizer and polymerization is initiated by heating to a reflux temperature in the order of 70°–80° C. Thereafter the remaining monomers, stabilizer (30%) and free radical initiator are added with ethyl acrylate in one feed stream while the acidic component, i.e. methacrylic acid and remaining stabilizer (20%) is added in a separate feed stream over a two to three hour addition period at the reflux temperature. Additional initiator (¼ total amount) is introduced in ethyl acetate in two portions over a further reaction period of 2 hours. After refluxing for an additional two hours, low boiling solvent is removed by heating to approximately 90° C. For this present invention it is important that the NAD be prepared with the carboxylic sites (or other ionizable sites) at the surface of the particle (or at least the majority be available to the surface) in order to provide the external acid sites on the suspended polymer particles. In this case the acid feed was started 10 minutes after the other monomer feed was commenced; and the acid feed was completed approximately 10 minutes after the other monomer feed was terminated.

Variants of the conditions shown in this example may be used as long as a stable NAD is produced where the acid sites are available for gelling and not buried in the body of the particle. It is recommended that an acid value determination be made on the NAD.

TABLE III

GENERAL MAKEUP OF NAD POLYMERS (PARTS BY WEIGHTS)

| | NAD-1 | NAD-2 | NAD-2A | NAD-3 | NAD-4 |
|---|---|---|---|---|---|
| Vinyl Acetate | 227 | 142 | 142 | 142 | 142 |
| Ethyl Acrylate | 104 | 212 | 237 | 237 | 212 |
| NAD Stabilizer | 76.4 | 76 | 76 | 57.5 | 58 |
| Methacrylic Acid | 28 | 26 | 38 | 30 | 18 |
| Mineral Spirits | 300 | 300 | 300 | 300 | 300 |
| Hexane | 300 | 300 | 300 | 300 | 300 |
| Azobisisobutyronitrile | 7.5 | 7.5 | 7.5 | 7.5 | 6 |
| Ethylacetate | 25 | 25 | 25 | 25 | 25 |
| Non-Volatile Content (final) | 42.4 | 47.5 | 49 | 49.8 | 58.1 |
| Acid Value NAD | 44.7 | 39.5 | 55.5 | 43.7 | 28.5 |

PREPARATION OF NAD STABILIZER 1000 parts 12-hydroxystearic acid, 3.5 parts tetraisopropyl titanate and 60 parts xylene were heated together at 200° C. under a nitrogen atmosphere. The reaction was monitored by collecting the by-product water. The resulting product had an acid value of 34.2 (calculated 33). This product was further reacted at 90° C. under nitrogen with 82.3 parts glycidyl methacrylate using 400 parts methyl ethyl ketone and 10 parts triethylamine to yield a second intermediate having an acid value of 4.3 and a non-volatile content of 93.4 (The methyl ethyl ketone is stripped off at the end of the reaction). This second intermediate (321 parts) was polymerized under free radical conditions with 225 parts methyl methacrylate in the presence of ethyl acetate (500 parts), dodecyl mercaptan (1.5 parts) and azobisisobutyronitrile (3.0 parts) free-radical initiator. The stabilizer was obtained in 98 percent yield.

PREPARATION OF ALKYD MODIFIER

A polyester alkyd condensation polymer was prepared by condensing 136 parts pentaerythritol, 560 parts dehydrated castor oil fatty acid, 135 parts Azelaic 1110 dimer acid, and 168 parts Empol 1014 dimer acid in a fusion cook at 460° F. to produce an alkyd resin having reactive carboxylic acid functionality, acid value of 41, and a molecular weight of 1500.

EXAMPLE 13

Resin NAD-2 (87 parts of 50 N/V suspension in mineral spirits) was formulated and blended to a #6 Hegman grind with 30 parts of alkyd modifier and 120 parts titanium dioxide. No driers were used in the formulation. In a similar fashion resin NAD-2A (94 parts of 50 N/V in mineral spirits) was blended with 25 parts alkyd modifier and 115 parts titanium dioxide. Various weights of sodium hydroxide (25% solution in methanol) were then added to form the solid paints identified in Table IV as Experiment 1A, and 1B. Solid paints IA and IB with respective gel strengths of 164 and 185 exhibited dimensional stability, had good application characteristics and gave a satisfactory dry coating on application to a test panel. By good application characteristics it is implied that on drawing the paint across the test panel a uniform film of paint is transferred to the panel and the work required to accomplish this is not excessive.

In a third paint, resin NAD-2 (94 parts of 50 N/V in mineral spirits) was blended with 25 parts alkyd modifier, 115 parts titanium dioxide, 0.5 parts cobalt drier (12 percent cobalt), 0.5 parts manganese drier (8 percent metal), 4.0 parts zirconium drier (12 percent metal); the driers are added for the alkyd modifier. 16.1 parts sodium hydroxide (25% solution in methanol) were then added to form the solid paint identified in Table IV as experiment IC. This product exhibited dimensional stability, had good application characteristics and exhibited an excellent dry on application to a test panel.

TABLE IV

| Exp. No. | Resin | Parts NaOH Added | Percent Neutralization Calculated on Moles Carboxylic Acid | Gel Strength* (24 hours) |
|---|---|---|---|---|
| IA | NAD-2 | 15.8 | 175 | 164 |
| IB | NAD-2A | 16.1 | 175 | 185 |
| IC | NAD-2A | 16.1 | 175 | 183 |
| IIA | NAD-1 | 12.8 | 200 | 135 |
| IIB | NAD-1 | 12.8 | 200 | 195 |
| IIC | NAD-1 | 12.8 | 200 | 221 |
| IIIA | NAD-2 | 11.2 | 200 | 240 |
| IIIB | NAD-2 | 14.0 | 250 | 190 |
| IVA | NAD-3 | 14.0 | 225 | 150 |
| IVB | NAD-3 | 16.2 | 225 | 200 |
| VIA | NAD-2 | 15.3 | 175 | 160 |

*Average of three readings.

EXAMPLE 14

Resin NAD-1 (110 parts) was formulated and blended to a #6 Hegman grind with 100 parts titanium dioxide, 0.015 parts cobalt drier (12% cobalt), 0.10 parts zirconium drier (12% zirconium) in three formulations A, B and C containing 5, 10 and 15 parts of tall oil alkyd (100% solids) respectively. Various weights of sodium hydroxide were then added as a 25 weight percent solution in methyl alcohol to form the solid paints identified in Table IV as Experiment IIA, and IIC. Solid paints IIA and IIB with gel strengths of 135 and 195 respectively exhibited satisfactory application characteristics. Solid paint IIC exhibited poor application characteristics. All three solid paints exhibited dimensional stability and gave a satisfactory dry coating on application to a test panel.

EXAMPLE 15

Resin NAD-2 (105 parts) was formulated and blended to a #6 Hegman grind with 100 parts titanium dioxide, 0.015 parts cobalt drier (12% cobalt), 0.10 parts zirconium drier (12% zirconium) and 10 parts tall oil alkyd (100%). Various weights of sodium hydroxide were added as a 25 weight percent solution in methyl alcohol to form the solid paints identified in Table IV as Experiments IIIA and IIIB. Solid paint IIIA with a gel strength of 240 had inferior application characteristics (too soft, heavy drag) as opposed to the good characteristics of solid paint IIIB having a gel strength of 190. Although the paints exhibited dimensional stability the film appearance was poor due to unsatisfactory coalescence.

EXAMPLE 16

Resin NAD-3 (101 parts) was formulated as indicated for NAD-2 in Example 13 above using 10 parts tall oil in one case and replacing the tall oil with 15 parts of the polyester alkyd modifier in the second case. The corresponding solid paints prepared by the addition of a 25 weight percent solution of sodium hydroxide in methanol are identified in Table IV as solid paints IVA and IVB respectively. Solid paints IVA and IVB with gel strengths of 150 and 200 exhibited dimensional stability and satisfactory application and film characteristics.

EXAMPLE 17

Paint blocks of approximate size 4"×6" formed from the above described solid paints were stored using a thin Saran (Trademark of the Dow Chemical Company) envelope for a period of six months. Application of these paints to a test panel after the storage period showed no detectable deterioration of the application and film characteristics. Additionally solid paints prepared from the same resins but having acid values in the range of from 25 to 60 gave acceptable solid paint characteristics. The best application properties were obtained when the gel strength as measured by the Universal penetrometer was between 130 and 195 mm. although formulations having gel strength of from 100-130 and 195-200 gave effective solid paints with somewhat less desirable characteristics.

EXAMPLE 18

Resin NAD-4 (94 parts of 50 N/V suspension in mineral spirits) was formulated and blended to a #6 Hegman grind with 30 parts of alkyd modifier, 100 parts titanium dioxide, 15 parts calcium carbonate, 0.65 parts cobalt drier (12 percent cobalt), 0.65 parts manganese drier (8 percent metal), and 6.0 parts zirconium drier (12 percent zirconium). Sodium hydroxide (25% solution in methanol) was then added to form the solid paint identified in Table IV as experiment VI A. This solid paint had good application characteristics, exhibited dimensional stability and gave a dry film on a test panel.

EXAMPLE 19

A "non-aqueous dispersion" was prepared without using added stabilizer. A monomer system was chosen so that it would be partially swelled in the non-polar solvent, this being enough to maintain stability of the dispersion.

In this case, 780 parts butyl acrylate, 100 parts methacrylic acid, 8 parts dodecyl mercaptan, 12 parts azobisisobutyronitrile, and 600 parts mineral spirits were charged to a reactor. The charge was brought to and held at 80° C. for 5 hours. Conversion was 97%, the acid value of the dispersion was 43.7. The theoretical acid value is 72, i.e. a certain amount of the acid is buried when this method of preparation is used.

Two aliquots each of 180 parts (60 percent N/V resin) were mixed with 25.0 parts (200% neutralization) and 37.5 parts (300% neutralization) of sodium hydroxide as a 25 percent solution in methanol. Both products exhibited dimensional stability; however, the application characteristics were poor.

This product is not a true NAD and could best be described as a very coarse dispersion. This does point out, however, the possibility of internal stabilization through a judicious choice of monomers. This system is not as stable and many of the ionizable sites are buried.

EXAMPLE 20

PREPARATION OF NON-BONDING NAD RESIN NON-AQUEOUS DISPERSION

NAD resins of the non-bonding type (i.e. without reactive functional sites - no gelling sites) were prepared by the addition polymerization of various monomers in the presence of non-solvents, free radical initiators and stabilizers, one example of which is given in the table shown below. A small portion of the monomers is charged to the polymerization kettle with the non-solvent (mineral spirits etc.) and about 50 percent of the desired stabilizer and polymerization is initiated by heating to 75°-80° C. After approximately 15-30 minutes, feeding of the remaining monomers, stabilizers, etc., is commenced and continued over 3-4 hours. The batch, held at reacting temperature for an additional hour, is then cooled to yield a milky dispersion having a low viscosity (100-200 cps) and a 46 percent by weight non-volatile content.

| Material | Charge | Feed |
|---|---|---|
| ethyl acrylate | 46 | 253 |
| methyl methacrylate | .9 | 64 |
| odourless mineral spirits[a] | 300 | 76 |
| mineral spirits[b] | 40 | 10 |
| stabilizer (38%) | 37.5 | 37.5 |
| azobis isobutyronitrile | 1.5 | 4.0 |

[a]boiling range 174°-210° C.
[b]boiling range 149°-204° C.

EXAMPLE 21

Although a wide variety of NAD Stabilizers of the type exemplified in Examples 13-19 are suitable for the preparation of Non-bonding NAD resins the following illustrates the preparation of a particularly desirable and useful stabilizer:

900 parts 12-hydroxystearic acid, 3.1 parts tetraisopropyl titanate and 90 parts odourless mineral spirits were heated together at 210° C. under a nitrogen atmosphere. The reaction was monitored by collecting the by-product water. The resulting product had an acid value of 36 (calculated 33). The product was further reacted at 190° F. under nitrogen with 97.6 parts glycidyl methacrylate using 10 parts triethylamine as a catalyst. This reaction product had an acid value of 1.8 and a non-volatile content 91.0. This second intermediate (440 parts) was polymerized under free radical conditions at 85° C. using 2.0 parts azobis isobutyronitrile with 300 parts methyl methacrylate in the presence of odourless mineral spirits (800 parts). The product was reduced with 300 parts odourless mineral spirits. The final non-volatile content by weight was 38%.

EXAMPLE 22

Alkyd Resin J, having bonding sites and particularly useful in preparing solid paints in combination with the non-bonding NAD Resin NON-AQUEOUS DISPERSIONS shown in Example 20, was prepared by polymerizing a mixture of 295 parts trimethylol propane, 690 parts dehydrated castor oil fatty acid, 340 parts Azelaic dimer (AZELAIC 1110) and 423 parts EMPOL 1014 at a temperature of 250° C. to an acid value of 42. The resulting resin gives a Gardner-Holt viscosity of $Z_2$.

EXAMPLE 23

Solid paints were prepared from Resin J using the following formulations:

| Materials                              | Parts |      |
|----------------------------------------|-------|------|
| Experiment No.                         | 1     | 2    |
| Non-Bonding NAD Resin                  | 100   | 100  |
| Ion-Bonded Resin J                     | 25    | 30   |
| AC 100                                 | 5     | —    |
| Rheox 1                                | 1     | 1.2  |
| Titanium Dioxide                       | 100   | 100  |
| Min-U-Sil 10                           | 10    | 10   |
| Celite 499                             | 10    | 10   |
| Cobalt drier (12.0 percent metal)      | 0.65  | 0.70 |
| Manganese drier (9.0 percent metal)    | 0.25  | 0.3  |
| Zirconium drier (12.0 percent metal)   | 2.5   | 3.0  |
| Methanol                               | 2.0   | 1.0  |
| Sodium hydroxide - methanol            | 6.0   | 7.0  |
| (24 percent sodium hydroxide)          |       |      |
| % neutralization                       | 195   | 195  |
| gel strength (mm.)                     | 160   | 150  |

The materials were added in the order shown, except that half of the quantity of NAD (50 parts) were held out until after the grind was achieved (i.e. all the pigments were added). Grind was 5½ Hegman. After the remaining NAD was added and the batch cooled, the driers were added. The driers were allowed to mature for ½ hour before the sodium hydroxide-methanol was added with agitation under reduced pressure in a "vacuum Cowles" to form a solid paint. This manner of addition diminishes the chances of entrapping air into the "final" solid paint.

Both paints exhibited dimensional stability. When rubbed (by hand) on a substrate, paint was transferred to the substrate forming a film. Both films exhibited dry over night.

The solid paints formed by combining Non-Bonding NAD resins with lesser quantities of ION-bonded resins of the IA type exemplified in Examples 1–12 and 22 are particularly for the trade sales (consumer) segment of the coating industry as well as for commercial coating applications such as for maintenance coatings and coil coating. The particular advantage of such combination and intercombination of ion-bonding and NAD resins (both bonding and non-bonding types) is that dimensional stability is retained with less bonding sites while application and film characteristics are greatly improved.

EXAMPLE 24

The change in the proportion of Non-Bonding NAD resins shown in Example 23 from 75 to 200 parts NAD resin per 25 parts of ion-bonded resin will yield equally satisfactory dimensionally stable solid paints.

EXAMPLE 25

PREPARATION OF NON-BONDING NAD RESIN NB-2

NAD Resin NB-2 is prepared by addition polymerization according to the procedure given in Example 20 using the same reactants except that the feed and charge were as follows:

| Material                | Charge | Feed |
|-------------------------|--------|------|
| ethyl acrylate          | 10     | 75   |
| methyl methacrylate     | 40     | 275  |
| odourless mineral spirits | 250  | 30   |
| mineral spirits         | 70     | 5    |
| stabilizer (38%)        | 25     | 50   |
| azobis isobutyronitrile | 1.5    | 4    |

The stabilizer used was prepared according to Example 21. A low viscosity (100–200 cps), milky dispersion having a 53 percent by weight non-volatile content was obtained.

EXAMPLE 26

Solid paints were prepared from Alkyl Resin J (having bonding sites) using the following formulation:

| Materials                              | Parts |       |
|----------------------------------------|-------|-------|
| Experiment No.                         | 3     | 4     |
| Non-Bonding NAD Resin NB-2             | 35.0  | 50.0  |
| Ion-Bonded Resin J                     | 55.0  | 55.0  |
| AC 100                                 | 26.0  | 26.0  |
| Rheox 1                                | 1.0   | 1.0   |
| Titanium Dioxide                       | 100.0 | 100.0 |
| Min-U-Sil                              | 10.0  | 10.0  |
| Celite 499                             | 10.0  | 10.0  |
| Odourless mineral spirits              | 35.0  | 35.0  |
| Cobalt drier (12.0 percent metal)      | 0.25  | 0.25  |
| Manganese drier (9.0 percent metal)    | 0.15  | 0.15  |
| Zirconium drier (12.0 percent metal    | 2.5   | 2.5   |
| Sodium hydroxide - methanol            | 8.0   | 8.0   |
| (24 percent sodium hydroxide)          |       |       |
| Gel strength (mm.)                     | 160   | 175   |

The materials were added in the order shown. Grind was 5½ Hegman. After mineral spirits and the non-bonding NAD resin were added to the grind, temperature was adjusted to below 40° C. and the driers added. The batch was allowed to mature for ½ hour and then the sodium hydroxide-methanol was added with agitation under reduced pressure in a "vacuum Cowles" to form a solid paint.

Both paints exhibited dimensional stability giving the above noted gel strengths determined 24 hours after gelling. When rubbed (by hand) on a substrate, paint was transferred to the substrate forming a film. Both films were dry to touch in approximately one hour.

All gel strengths were determined using a solid magnesium penetrometer with stainless steel point and penetration cone weighing 102 gm. ±50 mg. All test readings were taken 5 seconds after the cone was released.

The solid paint films of the present invention can be applied to the substrate workpieces to which paints and coatings are usually applied for protective or decorative purposes. The instant solid paints will be useful for consumer orientated artistic and household products as well as for industrial purposes. The substrate being coated can be metal, mineral, glass, wood, paper, plastic and fabric subject to the particular art skills in these areas. The instant solid paints are particularly useful for indoor decoration of walls and structural components including wood, wall board, plaster, plasterboard, and similar surfaces.

The above Examples are illustrative of the best mode for the practice of this invention and are not to be construed as limitations thereon.

What we claim is:

1. A dimensionally stable solid paint composition having a gel strength ranging from 100 to 200 millimeter penetration comprising the admixture of:
   a. a polymer mixture composition consisting of
      (1) a non-bonding non-aqueous dispersion resin comprising a stabilized dispersion of a polymer having a molecular weight ranging from 25,000 to 1,000,000 dispersed as a 25 to 90 weight percent suspension in a non-polar non-solvent, said resin having no reactive functional group sites; and
      (2) a solution of an ion-bonding resin having a molecular weight ranging from 1,000 to 7,000 and sufficient reactive acid functional groups selected from carboxylic, sulfonic and phosphonic groups to provide an acid number from 20 to 80, said resin dissolved in a non-polar solvent to provide a 25 to 90 weight percent solution; the proportion of non-bonding non-aqueous dispersion resin to ion-bonding resin being from 2:1 to 8:1;
   b. an ionic cross-linking agent comprising a solution or suspension of a metal hydroxide, ammonium hydroxide or organic cation former in a polar solvent of dielectric strength greater than 10, said metal hydroxide selected from the group consisting of sodium, potassium, lithium, barium, calcium, manganese and magnesium;
   c. a metallic drier in amounts from about 0 to 5 weight percent based on the total weight of polymer; wherein said composition contains metal hydroxide, ammonium hydroxide, or organic cation former in excess of, from 100 to 600 mole percent, the amount required to neutralize said reactive acid group of the resin.

2. A composition according to claim 1, wherein the cross-linking agent is a metal hydroxide selected from sodium, potassium, lithium, barium, calcium, manganese and magensium hydroxides; the polar solvent is selected from the group consisting of a $C_{1-8}$ aliphatic alcohol, formamide and water; and the functional group is a carboxylic acid group.

3. A composition according to claim 2, wherein the polar solvent is methanol and the cross-linking agent is sodium hydroxide.

4. A composition according to claim 1 wherein the ion-bonding resin solution is a polyester resin having a molecular weight of 1500–3500 and acid number 38–48 and is dissolved in mineral spirits and the ionizing cross-linking agent is sodium hydroxide present at 220–280 mole percent excess basis the acid functional group.

5. A composition according to claim 1 which comprises from 1 to 3 weight percent of organic acid metal salt drier, said metal being selected from cobalt, zinc, magnesium, aluminum, manganese and zirconium.

6. A composition according to claim 1, wherein the polymer composition comprises a mixture of a non-bonding non-aqueous dispersion with an ion-bonding resin solution, the proportion of the former to the latter being from 2:1 to 4:1.

7. A paint stick comprising the solid paint according to claim 1.

8. A substrate coated with the solid paint of claim 3.

9. A composition according to claim 1 wherein the non-bonding non-aqueous dispersion resin comprises a polyacrylate resin having a molecular weight of 100,000 to 300,000 suspended in mineral spirits, the ion-bonding resin has an acid number of 30–40 and the cross-linking agent is sodium hydroxide present at 120–280 mole percent basis reactive acid functional group of said ion-bonding resin.

10. A composition according to claim 9 wherein the non-aqueous dispersion resin is a methylmethacrylate-ethyl acrylate copolymer resin having a molecular weight of 100,000 to 300,000, the ion-bonding resin solution has an acid number of 25 to 80 and the mixture is reacted with 210–250 mole percent of sodium hydroxide as a 25 weight percent solution in methanol.

11. A paint stick comprising the solid paint of claim 10 encased in a removable protective covering.

12. A substrate coated with the solid paint of claim 10.

13. A process for preparing a solid paint having dimensional stability based on ion bonding and a gel strength from 100 to 200 which comprises:
   a. mixing a non-bonding non-aqueous dispersion resin comprising a stabilized dispersion of a polymer having a molecular weight ranging from 25,000 to 1,000,000 dispersed as a 25 to 90 weight percent suspension in a non-polar non-solvent, said resin having no reactive functional group sites, with a solution of an ion-bonding resin having a molecular weight ranging from 1000 to 7000 and sufficient reactive acid functional groups selected from carboxylic, sulfonic and phosphonic groups to provide an acid number from 20 to 80, said ion-bonding resin being formulated as a 25 to 90 weight percent solution in a non-polar solvent; the ratio of non-bonding non-aqueous dispension resin to ion-bonding resin being from 2:1 to 8:1 and sufficient to provide the indicated dimensional stability when cross-linked by ionic cross-linking agents;
   b. mixing pigments, fillers, and 0 to 5 weight percent of an organic acid metal salt drier into the resin solution;
   c. adding thereto under vigorous stirring a 20 to 30 weight percent solution or suspension of metal hydroxide, ammonium hydroxide, or organic cation former in a $C_{1-8}$ aliphatic alcohol containing in excess of, from 100 to 600 mole percent, the amount required to neutralize said reactive acid group of the resin.

14. A process according to claim 13 wherein the ion-bonding resin is a homopolymer or copolymer selected from aklyd resin, unsaturated polyester, polyolefin, polyvinyl chloride, polymethacrylate, polyacrylate, or mixtures thereof, and said reactive acid functional group is a carboxylic acid group.

15. A process according to claim 14, wherein a polyester having a molecular weight of 1500 to 3500 and an acid number of 25 to 48 is reacted with 200–300 mole percent of sodium hydroxide as a 25 weight percent solution basis mole of carboxylic acid group.

16. A process according to claim 14, wherein the proportion of non-bonding non-aqueous dispersion resin to ion-bonding resin is from 2:1 to 8:1.

17. A solid paint prepared according to the process of claim 16.

18. A substrate coated with a dimensionally stable solid paint comprising the admixture of:
- a. a polymer composition selection from the group consisting of
  - (1) a stabilized non-aqueous dispersion of a polymer having a molecular weight ranging from 25,000 to 1,000,000 and sufficient reactive acid functional groups selected from the group consisting of carboxylic, sulfonic and phosphonic to provide an acid number from 25 to 60, said polymer dispersed as a 25 to 90 weight percent suspension in a non-polar non-solvent;
  - (2) a mixture of a non-bonding non-aqueous dispersion resin comprising a stabilized dispersion of a polymer having a molecular weight ranging from 25,000 to 1,000,000 dispersed as a 25 to 90 weight percent suspension in a non-polar non-solvent, said resin having no reactive functional group sites, with an ion-bonding resin solution as defined in (1), the proportion of non-bonding non-aqueous dispersion resin to ion-bonding being from 2:1 to 8:1; and
- b. an ionic cross-linking agent selected from the group consisting of metal hydroxide, ammonium hydroxide, or an organic cation former dissolved in a polar solvent of high dielectric strength to provide a 10–50 weight percent solution or suspension; and
- c. a metallic drier in amounts from about 0 to 5 weight percent based on the total weight of polymer;

wherein said composition contains said metal hydroxide, ammonium hydroxide, or organic cation former in excess of, from 100 to 600 mole percent, the amount required to neutralize said reactive acid group of the resin.

* * * * *

UNITED STATES PATENT AND TRADEMARK OFFICE
CERTIFICATE OF CORRECTION

PATENT NO. : 4,148,776
DATED : April 10, 1979
INVENTOR(S) : Alfred Norman Dunlop and Christopher G. Rickard It is certified that error appears in the above–identified patent and that said Letters Patent are hereby corrected as shown below:

Column 3, line 10, "I.S." should read -- I.A. --; Column 5, line 34, "31 50° to" should read -- -50° to --; Column 11, line 56, in the Table, "metahanol" should read -- methanol --; Column 14, line 56, "Experiment IIA and IIC" should read -- Experiment IIA, IIB and IIC --.

Signed and Sealed this

Fourth Day of September 1979

[SEAL]

Attest:

LUTRELLE F. PARKER

Attesting Officer     Acting Commissioner of Patents and Trademarks

UNITED STATES PATENT AND TRADEMARK OFFICE
CERTIFICATE OF CORRECTION

PATENT NO. : 4,148,776
DATED : April 10, 1979
INVENTOR(S) : Alfred Norman Dunlop & Christopher Grant Rickard It is certified that error appears in the above-identified patent and that said Letters Patent are hereby corrected as shown below:

Delete the word "millimeter(s)" or its abbreviation "mm" at each of the following locations:

Col. 2, line 19: delete the word "millimeter".
Col. 3, line 29: delete the word "millimeter".
Col. 4, line 49: following the number 195, delete "mm".
Col. 4, line 50 bridging line 51: delete the word "millimeter".
Col. 10, line 21: following the number 180, delete "mm".
Col. 11, line 35: following the number 160, delete "mm".
Col. 11, line 58: in the last entry of the table following the words "Gel Strength", delete "(mm.)".
Col. 12, line 43: in the last entry of the table following the words "gel strength", delete "(mm)".
Col. 15, line 37: following the number 195, delete "mm".
Col. 17, line 33: following the words "gel strength", delete "(mm.)".
Col. 18, line 41: following the words "Gel strength", delete "(mm.)".
Col. 19, line 9 bridging line 10: after the number 200, delete the word "millimeter".

Signed and Sealed this

Twenty-eighth Day of April 1981

[SEAL]

Attest:

RENE D. TEGTMEYER

Attesting Officer

Acting Commissioner of Patents and Trademarks